United States Patent [19]

Iwai et al.

[11] 4,333,915

[45] Jun. 8, 1982

[54] PROCESS FOR PRODUCING METALLIC CARBONITRIDE

[75] Inventors: Tadashi Iwai; Takashi Kawahito; Masahiro Tokuse, all of Ube, Japan

[73] Assignee: UBE Industries, Ltd., Yamaguchi, Japan

[21] Appl. No.: 249,353

[22] Filed: Mar. 31, 1981

[30] Foreign Application Priority Data

Jun. 20, 1980 [JP] Japan ................................ 55-82867

[51] Int. Cl.³ ........................ C01B 33/00; C01C 3/08; C04B 35/56; C04B 35/58
[52] U.S. Cl. .................................. 423/324; 423/371; 423/409; 423/411; 501/87; 501/92
[58] Field of Search .................... 501/87, 92; 423/371, 423/409, 411, 253, 324

[56] References Cited

U.S. PATENT DOCUMENTS 3,591,338  7/1971  Roberts ................................ 423/411
4,196,178  4/1980  Iwai et al. ........................ 423/411 X
4,247,529  1/1981  Mori et al. .......................... 423/371

FOREIGN PATENT DOCUMENTS 51-100999  9/1976  Japan.
51-101000  9/1976  Japan.
52-53031   4/1977  Japan.

*Primary Examiner*—Helen M. McCarthy
*Attorney, Agent, or Firm*—Austin R. Miller

[57] ABSTRACT

The carbonitrides of metals such as those of Groups IV, V and VI of the Periodic Table are prepared by calcining a precursor obtained by (i) reacting the reaction product of ammonia and the halide of a metal with carbohydrate and/or polyvinyl alcohol, or (ii) reacting the reaction product of carbohydrate and/or polyvinyl alcohol and the halide of a metal with ammonia. The desired metallic carbonitride in the form of finely divided powder having a uniform size and excellent sintering properties can be obtained at low energy consumption.

15 Claims, No Drawings

PROCESS FOR PRODUCING METALLIC CARBONITRIDE

The present invention relates to a process for producing metal carbonitrides. More specifically, it relates to a process for producing the carbonitrides of elements of Groups IV, V and VI of the Periodic Table of Elements.

The term "the carbonitride of a metal" or "a metallic carbonitride" as used herein means (a) a solid solution of a metallic carbide and a metallic nitride, (b) a mixture of a metallic carbide and a metallic nitride and (c) a mixture of the solid solution (a) and the mixture (b).

Carbonitrides of metals are known and mainly used as an ultra-rigid heat resistant material after sintering. Known methods for producing metallic carbonitrides are, for example, (1) a method for mixing powdered metallic carbide and powdered metallic nitride,
(2) a method for calcining the mixture as set forth in (1) above at a high temperature,
(3) a method for reacting metallic carbide with nitrogen or ammonia at a high temperature,
(4) a method for reacting metallic nitride with methane or carbon at a high temperature.

However, there are disadvantages in the above-mentioned methods (1) and (2) that (a) special apparatus for uniformly mixing the powdered metallic carbide and metallic nitride with each other is required and, also, (b) an extremely large amount of energy is required to separately calcine the metallic carbide and the metallic nitride prior to the preparation of the desired metallic carbonitride. Similarly, there is also a disadvantage in the above-mentioned methods (3) and (4) that, since the metallic carbide or metallic nitride, which has been previously obtained from the calcination at a high temperature, should be reacted with the nitrogen or carbon source at a high temperature, the energy consumption becomes large. Furthermore, there is also a disadvantage in each of the above-mentioned conventional methods (1), (2), (3) and (4) that finely divided powder of the desired metallic carbonitride having a uniform size is difficult to produce.

Accordingly, an object of the present invention is to obviate the above-mentioned disadvantages of the prior conventional method for producing the metallic carbonitrides and to provide a process for producing the carbonitrides of metals in which (i) the desired metallic carbonitride can be produced at a low energy consumption, (ii) a finely divided powder of the metallic carbonitride can be produced having a uniform size and having excellent sintering properties and (iii) the desired composition of the metallic carbonitride can be readily controlled.

Other objects and advantages of the present invention will be apparent from the following description.

In accordance with the present invention, there is provided a process for producing the carbonitride of a metal comprising the step of calcining a precursor obtained by (i) reacting the reaction product of ammonia and the halide of a metal wth at least one member selected from the group consisting of carbohydrates and polyvinyl alcohols, or (ii) reacting the reaction product of the halide of a metal and at least one member selected from the group consisting of carbohydrates and polyvinyl alcohols with ammonia.

According to the present invention, since the desired metallic carbonitride can be produced only by calcining the above-mentioned precursor, the heat consumption is low. In addition, since the desired metallic carbonitride in the form of finely divided uniform shaped powder is obtained, the sintering properties thereof are excellent. Furthermore, a metallic carbonitride having the desired composition can be advantageously produced by changing the amount of the carbohydrates and/or polyvinyl alcohols to be used.

Typical examples of the halides of metals used in the present invention are those of a metal selected from the group consisting of Groups IV, V and VI of the Periodic Table of Elements. Examples of such metallic halides are the chlorides, the bromides and the iodides of metals, such as, silicon, titanium, zirconium, hafnium, vanadium, niobium, tantalum, chromium, molybdenum, tungsten and the like. These metallic halides can be used alone or in any mixture thereof.

The carbohydrates used in the present invention can be monosaccharides, oligosaccharide and polysaccharide. Examples of such carbohydrates are glucose, galactose, arabinose, saccharose, maltose, lactose, starch, cellulose and the like.

The polyvinyl alcohols used in the present invention preferably include those which are obtained by saponifying from 30 to 100% of the acetyl groups contained in polyvinyl acetate. Although there is no limitation in the polymerization degree of the polyvinyl alcohols, the polyvinyl alcohols having a polymerization degree of from 500 to 2000 can be desirably used in the present invention.

Ammonia can be used, either in the liquid state or in the gaseous state, in the present invention.

The precursor of the metallic carbonitride used in the present invention can be produced by (i) a method for reacting the reaction product of the metallic halide and ammonia with the carbohydrate and/or the polyvinyl alcohol, or
(ii) a method for reacting the reaction product of the metallic halide and the carbohydrate and/or the polyvinyl alcohol with ammonia.

Each of these methods (i) and (ii) will be described hereinbelow.

Method (i)

The metallic halide and ammonia can be reacted in any known manner. For instance, a method of gradually adding liquid ammonia to a solution of suspension of the metallic halide in an inert organic solvent or a method of blowing gaseous ammonia through said solution or suspension can be utilized. The liquid or gaseous ammonia is preferably added to or blown through the solution or suspension until the reaction of the metallic halide therewith is completed. The reaction temperature is generally within the range of from $-80°$ C. to $300°$ C., preferably from $-50°$ C. to $200°$ C. The reaction product thus obtained can be reacted with the carbohydrate and/or the polyvinyl alcohol directly as the reaction mixture or after isolating the desired reaction product from the reaction mixture.

There are no special limitations in the method for reacting the reaction product of the metallic halide and ammonia with the carbohydrate and/or the polyvinyl alcohol. For instance, the reaction product of the metallic halide and ammonia can be reacted with the carbohydrate and/or the polyvinyl alcohol by either adding the carbohydrate and/or the polyvinyl alcohol or a solution or suspension thereof in an inert organic solvent to a suspension of the reaction product in an inert organic solvent or the reaction mixture itself obtained in the previous step; or vice versa. The reaction temperature is generally within the range of from −50° C. to 150° C. The precursor thus obtained can be subjected to a subsequent calcination step after isolation.

Method (ii)

There are no special limitations in the method for reacting the metallic halide with the carbohydrate and/or the polyvinyl alcohol. For instance, the metallic halide can be reacted with the carbohydrate and/or the polyvinyl alcohol by either adding the carbohydrate and/or the polyvinyl alcohol or a solution or suspension thereof in an inert organic solvent to a solution or suspension of the metallic halide in an inert organic solvent; or vice versa. The reaction temperature is generally within the range of from −50° C. to 150° C. The reaction product can be reacted with ammonia directly as the reaction mixture or after isolating the desired reaction product from the reaction mixture.

There are also no special limitations in the method for reacting the reaction product obtained above with ammonia. For instance, the reaction product can be reacted with ammonia by gradually adding liquid ammonia to, or blowing gaseous ammonia through, a solution or suspension of the reaction product in an inert organic solvent or the reaction mixture obtained in the previous step. The reaction temperature is generally within the range of from −80° C. to 300° C., preferably from −50° C. to 200° C. The precursor thus obtained can be subjected to a subsequent calcination step after isolation.

In the above-mentioned methods (i) and (ii), each reaction is preferably carried out, with or without stirring, in the absence of water and oxygen. The inert organic solvent which can be used in the above-mentioned reactions include, for example, aromatic hydrocarbons such as benzene, toluene, xylene; aliphatic hydrocarbons such as hexane, heptane, octane; and halogenated hydrocarbons such as chlorobenzene, chlorotoluene, carbon tetrachloride, methylene chloride.

In the above-mentioned methods (i) and (ii), the carbohydrate and/or the polyvinyl alcohol are preferably used in an amount within the range of value N defined by the following relationship [I] of from more than 0 to less than 6, more preferably from more than 0 to less than 4.

$$N = (a \times b)/c \qquad [I]$$

wherein a is the number of hydroxyl groups contained in the base unit (or repeating unit) of the carbohydrate and/or the polyvinyl alcohol, b is a value of the amount (g) of the carbohydrate and/or the polyvinyl alcohol used divided by the formula weight of the base unit thereof and c is the number of moles of the metallic halide (in the case of the method (i), c of the relationship [I] represents the number of moles of the metallic halide used in the reaction thereof with ammonia).

For instance, in the above-mentioned relationship [I], in the case where glucose is used as carbohydrate, a of the relationship [I] is 5, b is the value of the amount (gr.) of the used glucose divided by the formular weight of the glucose (i.e. 180), and, in the case where polymerization derivative of the glucose is used as starch, a of the relationship [I] is 6 and b is the value of the amount (gr.) of the used starch divided by the formular weight of the base unit of the starch (i.e. 324).

As the value N of the above-mentioned relationship [I] is decreased, the proportion of the metallic nitride contained in the produced metallic carbonitride increases. Therefore, according to the present invention, a metallic carbonitride having any desired composition can be effectively produced.

According to the present invention, the precursor obtained in the above-mentioned methods (i) or (ii) is then calcined in the subsequent step. Thus, the precursor is pyrolytically decomposed to convert the inorganic substance and the desired metallic carbonitride is obtained.

The calcination temperature is generally within the range of from 700° C. to 2300° C., preferably from 800° C. to 2000° C. The precursor is preferably heated up to about 400° C. at a heating rate of from about 0.1 to about 10° C./min. In the case of the heating rate being too fast, the calcination operation becomes difficult due to the swelling of the precursor. On the other hand, in the case of the heating rate being too slow, it is likely that the particle size of the resultant metallic carbonitride becomes undesirably large. After the precursor is heated to about 400° C., the precursor can be rapidly heated to a desired calcination temperature. The calcination is preferably carried out, in the absence of water and oxygen, in a gas atmosphere of argon, helium, hydrogen or ammonia or in vacuo. The calcination period of time is generally within the range of from 0.5 to 10 hours, preferably 1 to 3 hours.

The present invention now will be further illustrated by, but is by no means limited to, the following Examples. In the following Examples, the compositions of the calcined products were identified according to a X-ray diffraction analysis and the specific surface areas of the metallic carbonitrides were determined according to a BET method based on nitrogen gas adsorption.

EXAMPLE 1

A quartz reaction tube having an inner diameter of 4 cm and a length of 40 cm and provided with a gas feed pipe, a gas discharge pipe, an agitator and a dropping funnel was used and the atmosphere therein was replaced with argon. A solution of 12.0 g of titanium tetrachloride dissolved in 150 ml of toluene was then introduced into the reaction tube. The reaction tube was dipped in a dry ice-methanol bath and gaseous ammonia was continuously blown through the gas feed pipe into the titanium tetrachloride in toluene solution with stirring for 60 minutes at a rate of 50 m mol/min. Upon the blowing of the gaseous ammonia, orange precipitate of the reaction product was formed.

After removing the dry ice-methanol bath from the reaction tube, the reaction mixture is heated to a temperature of 25° C., while argon is gently passed through the reaction tube. Thereafter, a suspension of 7.0 g of saccharose in 30 ml of toluene was added, through the dropping funnel, to the reaction mixture for 10 minutes. Upon the addition of the saccharose, the orange precipitate was changed to a reddish-brown precipitate.

After the toluene was distilled off, the precursor was first heated to 450° C. at a heating rate of 3° C./min and, then, heated to 700° C. at a heating rate of 5° C./min, while argon was gently passed through the reaction tube. Thereafter, the precursor was maintained at a temperature of 1400° C. for 2 hours under an argon atmosphere in an electric furnace. Thus, 3.2 g of titanium carbonitride in the form of finely divided powder was obtained. The resultant titanium carbonitride was a solid solution of 83% by weight of titanium carbide and 17% by weight of titanium nitride. The nitrogen content of the resultant product was 3.8% by weight as measured by a Kjeldahl analysis. The specific surface area of the titanium carbonitride was 3.6 m$^2$/g and the finely divided particles had a diameter of from 0.1 to 0.5 microns as visually determined by a scanning type electron microscope.

EXAMPLE 2

Example 1 was repeated, except that the amount of the saccharose was changed to 3.4 g. Thus, 3.1 g of titanium carbonitride in the form of finely divided powder was obtained. This titanium carbonitride was a solid solution of 37% by weight of titanium carbide and 63% by weight of titanium nitride. The specific surface area of the product was 3.8 m$^2$/g.

EXAMPLE 3

Example 1 was repeated, except that 11.0 g of silicon tetrachloride was used instead of the titanium tetrachloride. Thus, 2.3 g of silicon carbonitride in the form of finely divided powder was obtained. This silicon carbonitride was a mixture of 78% by weight of silicon carbide and 22% by weight of silicon nitride. The specific surface area of the product was 4.1 m$^2$/g.

EXAMPLE 4

Example 1 was repeated except that 14.0 g of vanadium tetrachloride was used instead of the titanium tetrachloride and that the amount of the saccharose was changed to 8.0 g. Thus, 4.3 g of vanadium carbonitride in the form of finely divided powder was obtained. This vanadium carbonitride was a solid solution of 78% by weight of vanadium carbide and 22% by weight of vanadium nitride. The specific surface area of the product was 2.5 m$^2$/g.

EXAMPLE 5

Example 1 was repeated, except that 5.0 g of tungsten hexachloride was used instead of the titanium tetrachloride and that the amount of the saccharose was changed to 1.6 g. Thus, 2.4 g of tungsten carbonitride in the form of finely divided powder was obtained. In this Experiment, the tungsten hexachloride, as a suspension in toluene, was reacted with ammonia. The tungsten carbonitride thus obtained was a mixture of 79% by weight of tungsten carbide and 21% by weight of tungsten nitride. The specific surface area of the product was 0.9 m$^2$/g.

EXAMPLE 6

Example 1 was repeated except that 8.8 g of starch was used instead of saccharose. Thus, 3.4 g of titanium carbonitride in the form of a finely divided powder was obtained. This was a solid solution of 66% by weight of titanium carbide and 34% by weight of titanium nitride. The specific surface area of the product was 3.1 m$^2$/g.

EXAMPLE 7

Example 1 was repeated, except that 2.8 g of polyvinyl alcohol (saponification degree: 100%) was used instead of saccharose. Thus, 3.0 g of titanium carbonitride in the form of finely divided powder was obtained. This was a solid solution of 81% by weight of titanium carbide and 19% by weight of titanium nitride. The specific surface area of the product was 2.9 m$^2$/g.

EXAMPLE 8

Example 1 was repeated, except that 7.6 g of galactose was used instead of the saccharose. Thus, 3.4 g of titanium carbonitride in the form of finely divided powder was obtained. This titanium carbonitride was a solid solution of 92% by weight of titanium carbide and 8% by weight of titanium nitride. The specific surface area of the product was 3.4 m$^2$/g.

EXAMPLE 9

After the air contained in the reaction tube as used in Example 1 was replaced with argon, a solution of 12.0 g of titanium tetrachloride dissolved in 150 ml of toluene was introduced into the reaction tube. A suspension of 7.1 g of saccharose in 30 ml of toluene was, then, dropwise added, with stirring, to the toluene solution of titanium tetrachloride at a temperature of 25° C. for 10 minutes. Thereafter, the reaction tube was dipped in a dry ice-methanol bath and 50 m mol/min. of gaseous ammonia was blown, with stirring, through the reaction mixture from a gas feed pipe for 60 minutes.

After the toluene was distilled off, the precursor thus obtained was calcined in a manner as described in Example 1, except that gaseous ammonia was used up to 700° C. and argon was used after 700° C. Thus, 3.3 g of titanium carbonitride in the form of finely divided powder was obtained. This titanium carbonitride was a solid solution of 84% by weight of titanium carbide and 16% by weight of titanium nitride. The specific surface area of the product was 4.3 m$^2$/g.

EXAMPLE 10

Example 9 was repeated, except that 3.2 g of tantalum pentachloride was used instead of titanium tetrachloride and that the amount of the saccharose was changed to 1.5 g. 1.6 g of tantalum carbonitride in the form of finely divided powder was obtained. This tantalum carbonitride was a solid solution of 88% by weight of tantalum carbide and 12% by weight of tantalum nitride. The specific surface area of the product was 10.5 m$^2$/g.

We claim:

1. A process for producing a metallic carbonitride said metal being selected from the group consisting of Groups IV, V and VI of the Periodic Table of Elements, comprising the step of calcining a precursor obtained by (i) reacting the reaction product of ammonia and the halide of a metal with at least one member selected from the group consisting of carbohydrates and polyvinyl alcohols, or (ii) the reaction product of the halide of a metal and at least one member selected from the group consisting of carbohydrates and polyvinyl alcohols with ammonia.

2. A process as claimed in claim 1, wherein said carbohydrates are selected from monosaccharide, oligosaccharide and polysaccharide.

3. A process as claimed in claim 1, wherein said carbohydrates are selected from the group consisting of glucose, galactose, arabinose, saccharose, maltose, lactose, starch and cellulose.

4. A process as claimed in claim 1, wherein said polyvinyl alcohols are saponified polyvinyl acetates in which 30 to 100% of acetyl group is saponified.

5. A process as claimed in claim 1, wherein the amount of the carbohydrate and/or the polyvinyl alcohol is within the range of the value N defined by the following relationship of from more than 0 to less than 6.

$$N = (a \times b)/c$$

wherein a is the number of hydroxyl groups contained in the base unit of the carbohydrate and/or the polyvinyl alcohol, b is the value of the amount (g) of the carbohydrate and/or the polyvinyl alcohol used divided by the formula weight of the base unit thereof and c is the number of moles of the metallic halide.

6. A process as claimed in claim 5, wherein said value N is within the range of from more than 0 to less than 4.

7. A process as claimed in claim 1, wherein the calcination of the precursor is carried out at a temperature of from 700° to 2300° C.

8. A process as claimed in claim 7, wherein the calcination temperature is within the range of from 800° to 2000° C.

9. A process as claimed in claim 7, wherein the precursor is heated to a temperature of at least about 400° C. at a heating rate of 0.1 to 10° C./min.

10. A process as claimed in claim 1, wherein said halide of the metal is selected from the group consisting of the chlorides of silicon, titanium, vanadium, tantalum and tungsten.

11. A process as claimed in claim 1, wherein said reaction product of the ammonia and the halide of the metal is prepared by gradually adding liquid ammonia to or blowing gaseous ammonia through a solution or suspension of the halide of the metal in an inert organic solvent at a temperature of from −80° to 300° C.

12. A process as claimed in claim 11, wherein said reaction product is reacted with at least one member selected from the group consisting of the carbohydrates and the polyvinyl alcohols at a temperature of from −50° to 150° C.

13. A process as claimed in claim 1, wherein said reaction product of at least one member selected from the group consisting of the carbohydrates and the polyvinyl alcohols and the halide of the metal is prepared by adding at least one member selected from the group consisting of the carbon hydrates and the polyvinyl alcohol or a solution or suspension thereof in an inert organic solvent to a solution or suspension of the halide of the metal in an inert organic solvent at a temperature of from −50° C. to 150° C.

14. A process as claimed in claim 1, wherein said reaction product of at least one member selected from the group consisting of the carbohydrates and the polyvinyl alcohol and the halide of the metal is prepared by adding a solution or suspension of the halide of the metal in an inert organic solvent to at least one member selected from the group consisting of the carbohydrates and the polyvinyl alcohol or a solution or suspension thereof in an inert organic solvent at a temperature of from −50° to 150° C.

15. A process as claimed in claim 12 or 13, wherein said reaction product is reacted with liquid or gaseous ammonia at a temperature of from −80° to 300° C.

* * * * *